US006972945B1

(12) United States Patent
Kozak et al.

(10) Patent No.: US 6,972,945 B1
(45) Date of Patent: Dec. 6, 2005

(54) MODULAR COMPUTER DEVICE AND COMPUTER KEYBOARD FOR MODULAR DEVICE

(75) Inventors: Keith A. Kozak, Sioux City, IA (US); Charles T. Dammon, Sioux City, IA (US); Anton R. Poole, Dakota Dunes, SD (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 08/953,154

(22) Filed: Oct. 17, 1997

(51) Int. Cl.[7] .............................. H05K 5/02; G06F 3/02
(52) U.S. Cl. ....................... 361/680; 361/686; 708/142
(58) Field of Search ............................... 361/680, 686; 400/472, 479, 477, 486, 489; 364/708.1; 708/142; 341/22; 345/168–172; 235/145 R, 235/146, 145 A; 705/25; 380/52

(56) References Cited

U.S. PATENT DOCUMENTS

| 3,777,222 | A |   | 12/1973 | Harris ........................ 317/112 |
| 4,654,818 | A | * | 3/1987  | Wetterau, Jr. ............... 364/900 |
| 4,749,364 | A | * | 6/1988  | Arney et al. ................. 361/681 |
| 4,762,435 | A | * | 8/1988  | Richardson et al. ......... 400/304 |
| 4,989,167 | A | * | 1/1991  | Kapec et al. ............... 364/708 |
| 5,003,505 | A |   | 3/1991  | McClelland ................. 364/900 |
| 5,021,640 | A |   | 6/1991  | Muroi ........................ 235/462 |
| 5,049,863 | A |   | 9/1991  | Oka ............................ 340/710 |
| 5,056,059 | A |   | 10/1991 | Tivig et al. .................. 364/900 |
| 5,126,955 | A | * | 6/1992  | Tomoda ...................... 364/708 |
| 5,144,302 | A |   | 9/1992  | Carter et al. .................. 341/20 |
| 5,144,567 | A | * | 9/1992  | Oelsch et al. ................. 341/22 |
| 5,260,885 | A | * | 11/1993 | Ma .......................... 364/708.1 |
| 5,268,675 | A | * | 12/1993 | Garthwaite et al. ......... 345/163 |
| 5,305,449 | A |   | 4/1994  | Ulenas ...................... 395/500 |
| 5,341,133 | A |   | 8/1994  | Savoy et al. .................. 341/22 |
| 5,438,331 | A |   | 8/1995  | Gilligan et al. ............... 341/35 |
| 5,442,512 | A | * | 8/1995  | Bradbury .................... 361/683 |
| 5,475,626 | A | * | 12/1995 | Viletto ..................... 364/708.1 |
| 5,500,643 | A | * | 3/1996  | Grant .......................... 341/22 |
| 5,503,483 | A | * | 4/1996  | Petteruti et al. ............. 400/88 |
| 5,520,470 | A | * | 5/1996  | Willett ........................ 400/88 |
| 5,583,744 | A | * | 12/1996 | Oguchi et al. ................ 16/223 |
| 5,625,534 | A | * | 4/1997  | Okaya et al. ............... 361/686 |
| 5,633,782 | A | * | 5/1997  | Goodman et al. .......... 361/683 |
| 5,659,594 | A | * | 8/1997  | Toda .......................... 455/552 |
| 5,661,632 | A | * | 8/1997  | Register .................... 361/683 |

(Continued)

FOREIGN PATENT DOCUMENTS

| DE | 9407077  | 8/1994 |
| GB | 2287556  | 9/1995 |
| WO | 92/03884 | 3/1992 |
| WO | 95/24714 | 9/1995 |
| WO | 95/22652 | 7/1999 |

OTHER PUBLICATIONS

EPSON, EHT-30 Handheld Computer, SEIKO EPSON CORPORATION, HC001 Printed in Japan, Oct. 1993.*

(Continued)

Primary Examiner—Anatoly Vortman
(74) Attorney, Agent, or Firm—Ross F. Hunt, Jr.; Stites & Harbison PLLC

(57) ABSTRACT

A keyboard for a computer receptive to a modular or other device, and a modular touch screen device having at least one changeable virtual key, are described. The keyboard includes a connector receptive to a corresponding connector of a device such as a personal digital assistant (PDA) device. The device communicates with a computer through the keyboard in a docking mode. The modular touch screen device extends the capability of a keyboard to which it is connected in a docking mode by providing changeable virtual keys. In a stand-alone mode, the modular touch screen device acts as a truncated wireless keyboard, or a dynamic remote control, for a computer.

20 Claims, 7 Drawing Sheets

U.S. PATENT DOCUMENTS

| | | | | |
|---|---|---|---|---|
| 5,675,524 | A * | 10/1997 | Bernard | 364/705.05 |
| 5,752,857 | A * | 5/1998 | Knights | 235/380 |
| 5,767,844 | A * | 6/1998 | Stoye | 345/212 |
| 5,805,416 | A * | 9/1998 | Friend et al. | 361/686 |
| 5,809,083 | A * | 9/1998 | Wright | 375/285 |
| 5,815,109 | A * | 9/1998 | Tan | 341/177 |
| 5,835,732 | A * | 11/1998 | Kikinis et al. | 345/173 |
| 5,845,282 | A * | 12/1998 | Alley et al. | 707/10 |
| 2002/0054024 | A1 * | 5/2002 | Andres et al. | 345/168 |

OTHER PUBLICATIONS

PDA Buyer' Guide, Pen Computing Magazine, pp. 83 and 84, Aug. 1994.*

Copy of p. 540 from Academic Press Dictionary of Science and Technology, Academic Press, Inc, 1992 (edited by Christopher Morris).*

"8x930Hx Universal Serial Bus Hub Peripheral Controller", Advance Information published by Intel, 3 pages (May 1997).

"Hardware: Pilot's HotSync Connector", The Undocumented Pilot Page, http://www.bright.net/~mitchr/pilot/hw07.html, 3 pages (Printed from website Mar. 18, 1997).

"Palm Pilot", Product Information published by USRobotics, 2 pages (1997).

* cited by examiner

MODULAR COMPUTER DEVICE AND COMPUTER KEYBOARD FOR MODULAR DEVICE

FIELD OF THE INVENTION

This invention relates generally to modular computer devices and computer keyboards, and particularly to computer keyboards for modular devices.

BACKGROUND OF THE INVENTION

Modular devices for use in conjunction with and remote from a computer have seen recent widespread popularity. For example, some such devices permit a computer user access to data in a particular manner while away from the computer. Any changes made to the data in this remote mode are transferred back to the computer when the device is connected to the computer in a docking mode.

An example of such a modular device is the Pilot personal digital assistant (PDA) device, manufactured by and available from U.S. Robotics of Mountain View, Calif. The Pilot device is a hand-held device that permits a user to remotely take and store handwritten notes on an LCD touch screen. The Pilot device also has an assortment of e-mail and scheduling programs that permit the user to access these functions while away from the computer.

Currently, the Pilot device exchanges information with a computer via a cable that is attached to a stand-alone cradle. After placing the device into the cradle, the user presses a button on the cradle to synchronize the information within the device with information stored by the computer. In this way, the user is able to access and change information regardless of whether the Pilot device is docked to the computer or is being used remotely.

A shortcoming to this configuration for modular devices such as the Pilot PDA device is that it is inconvenient for the user of the computer. The cradle into which such devices are inserted consumes scarce desk-top real estate. Management of another cable is also necessary; the cradles for these modular devices usually have an extra cable that plugs into a serial port on the back of the computer.

SUMMARY OF THE INVENTION

The above-mentioned as well as other shortcomings are addressed by the present invention, which will be understood by reading and studying the following specification. The invention describes a keyboard for a computer having a communications link, such as a serial cable, and a connector. The connector is receptive to a corresponding connector of a device such as a PDA. The device communicates with the computer over the communications link when the connectors are coupled.

The keyboard in one embodiment includes an integrated cradle for the docking of modular devices such as PDA devices. A stand-alone cradle that consumes scarce desk-top real estate is not necessary. Furthermore, in a preferred embodiment in which there is a single cable (such as a Universal Serial Bus cable) between the inventive keyboard and the computer to which it is coupled, an additional cable is not required for the cradle. This promotes easier cable management.

Furthermore, the invention describes a novel modular computer device operable in a docking mode when it is connected to a computer peripheral such as a keyboard, and in a stand-alone mode when it is not connected to the peripheral. The device includes a controller defining at least one changeable virtual key on a touch screen of the device. An integrated wireless transceiver permits the device to communicate with the computer when operating in the stand-alone mode.

The changeable virtual keys of the novel modular device in effect extend the capabilities of the keyboard when the device is docked to the keyboard. The keys, for example, may change depending on the application actively running on the computer, in which case they are effectively automatic customized function keys. When the device is operating in the stand-alone mode, it acts as a changing customizable (dynamic) remote control device for the computer.

In different embodiments of the invention, computer keyboards, computerized systems and devices of varying scope are described. Still other and further aspects, advantages and embodiments of the invention will become apparent by reference to the drawings and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1:
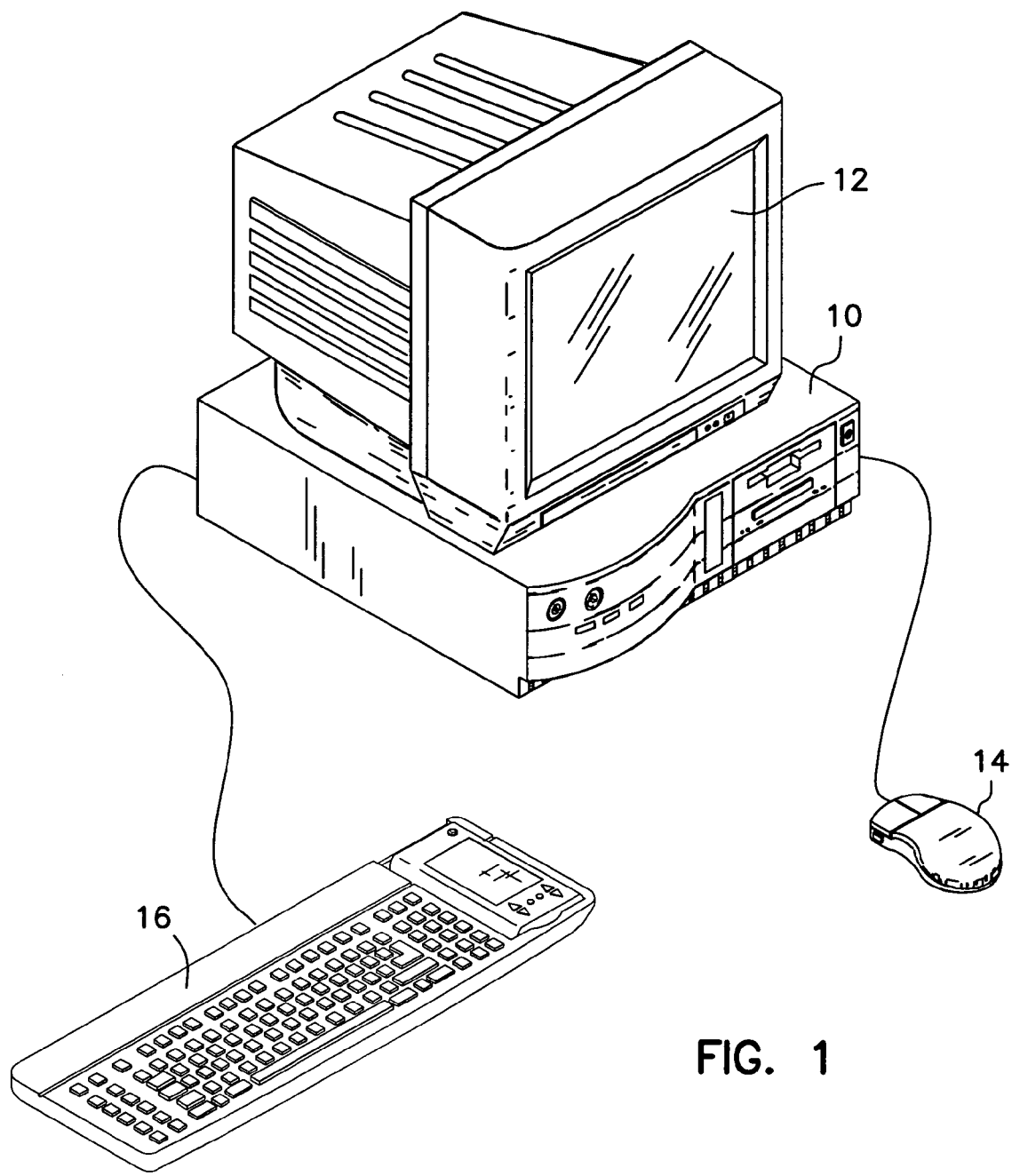
FIG. 1 is a diagram of a computerized system according to one embodiment of the invention.

Referring first to FIG. 1, a diagram of a computerized system according to one embodiment of the invention is shown. Computer 10 is coupled to monitor 12, pointing device 14, and inventive keyboard 16. Computer 10 includes a processor (preferably, an Intel Pentium processor), random-access memory (RAM) (preferably, at least sixteen megabytes), read-only memory (ROM), and one or more storage devices, such as a hard disk drive, a floppy disk drive, an optical disk drive, and a tape cartridge drive. The invention is not particularly limited to any type of computer 10. Computer 10 preferably is a PC-compatible computer running a version of the Microsoft Windows operating system. The construction and operation of such computers are known within the art.

Monitor 12 permits the display of information for viewing by a user of the computer. The invention is not limited to any particular monitor 12. Such monitors include cathode ray tube (CRT) displays, as well as flat panel displays such as liquid crystal displays (LCD's). Pointing device 14 permits the control of the screen pointer provided by the graphical user interface of operating systems such as versions of Microsoft Windows. The invention is not limited to any particular pointing device 14. Such pointing devices include mouses, touch pads, trackballs, and point sticks. In one embodiment, computer 10 is a Gateway 2000, Inc., desktop personal computer, monitor 12 includes a super-VGA CRT display, and pointing device 14 is a mouse.

Inventive keyboard 16 permits a modular device connected thereto to communicate with the computer through the keyboard. Inventive keyboard 16 is coupled to computer 10 via a communications link. The invention is not particularly limited to a given communications link. In one embodiment, the communications link is a Universal Serial Bus (USB) cable plugging into a corresponding USB port on the back of computer 10. In another embodiment, the communications link may also be comprised of more than one cable, such that the modular device communicates through the keyboard to the computer over a cable separate from other keyboard communication with the computer. In still another embodiment, the communications link is a wireless transceiver communicating to a corresponding wireless transceiver within computer 10.

Figure 2:
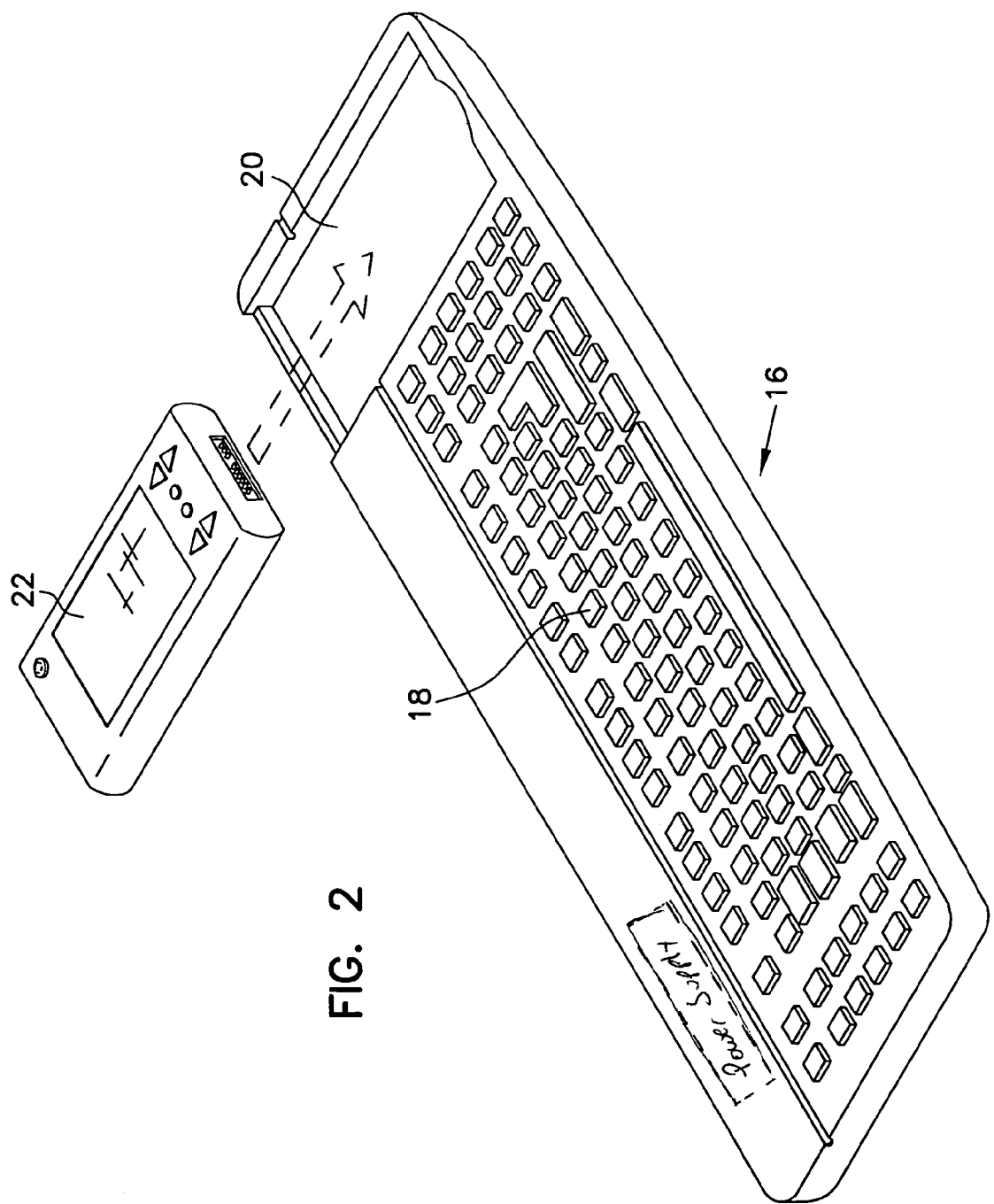
FIG. 2 is a diagram showing the inventive keyboard of FIG. 1 in more detail, according to one embodiment of the invention.

Referring now to FIG. 2, a diagram showing the inventive keyboard of FIG. 1 in more detail, according to one embodiment of the invention. Keyboard 16 includes a plurality of keys 18 disposed within its housing, identical to a standard personal computer (PC) keyboard. That is, keyboard 16 includes primary typing keys (the alphabetical keys of which are organized in typical QWERTY fashion), function keys (including function keys F1 through F12), DOS keys (including print screen, scroll lock, and break keys), navigation keys (including insert, delete, home, end, page up, and page down keys), and cursor keys. The invention is not particularly limited to any keyboard configuration, however.

As shown in FIG. 2, in lieu of a numeric keypad, there is cradle 20. Cradle 20 is receptive to a corresponding modular device 22. The invention is not limited to any particular modular device 22. Such devices include personal digital assistance (PDA) devices such as the U.S. Robotics Pilot, as previously described, as well as other consumer electronics devices (e.g., a telephone handset, a television remote control, etc.) and computer peripheral devices (e.g., swappable pointing devices such as a trackball, touch pad, etc.). Another device is the novel modular computer device described hereafter.

As shown in FIG. 2, cradle 20 is shaped so that device 22 fits into the cradle such that the front and top surfaces of device 22 are exposed. This permits device 22 to be used in two different modes, depending on the limitations of a particular device 22. In a first, stand-alone or remote mode, the device does not reside within the cradle. The user is able to use the device remotely from the keyboard and the computer to which the keyboard is attached. For example, a PDA device may be used as an electronic organizer when operating in the stand-alone mode. Devices not amenable to stand-alone mode operation include swappable pointing devices, which typically must be within cradle 20 in order to function.

In a second, docking mode, device 22 resides within cradle 20. In the docking mode, a connector of device 22 couples to a corresponding connector of cradle 20 (connectors not shown in FIG. 2). If the device had been operating in a stand-alone mode, docking the device within the cradle permits synchronization of the information within the device with the information stored within the computer. For example, in the case of a U.S. Robotics Pilot device, pressing a hot-sync key on the keyboard (not shown in FIG. 2), causes the computer to synchronize the contents of the device with that stored in the computer. Finally, if the particular device 22 is not operable in a stand-alone mode (e.g., a pointing device), the use of the docking mode permits such devices to be swapped as necessary (e.g., one user may prefer a touch pad pointing device, while another user may prefer a trackball pointing device), as known within the art.

Figure 3A:
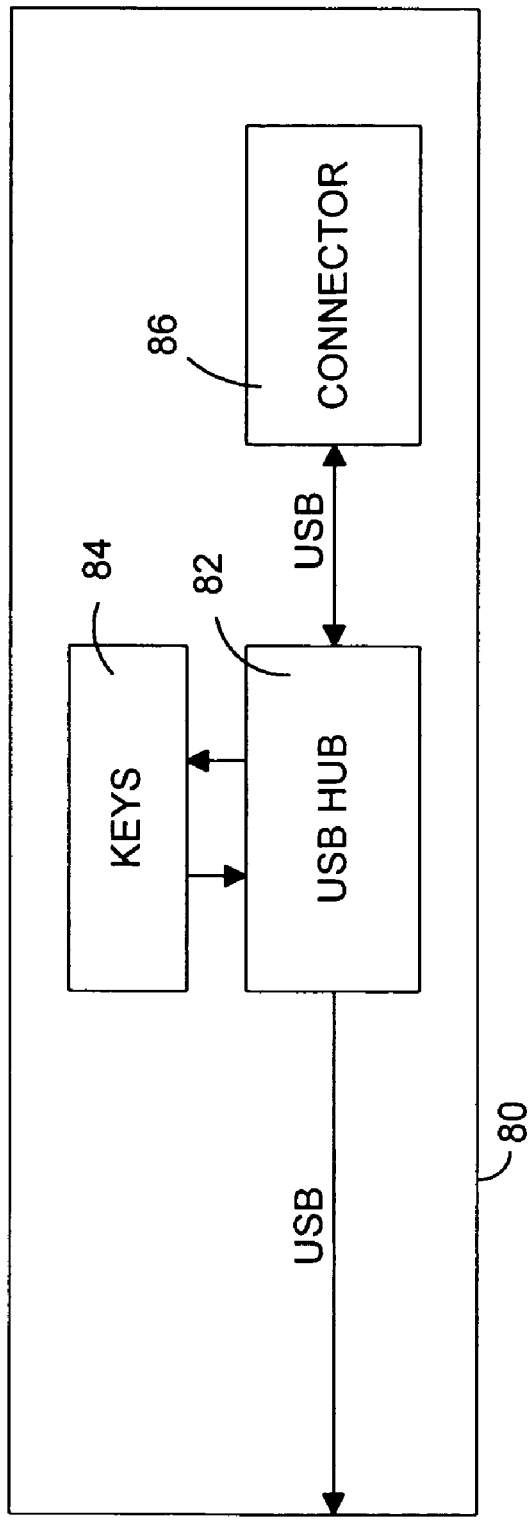
FIG. 3(a) is a block diagram of an inventive keyboard according to one embodiment of the invention.
Figure 3B:
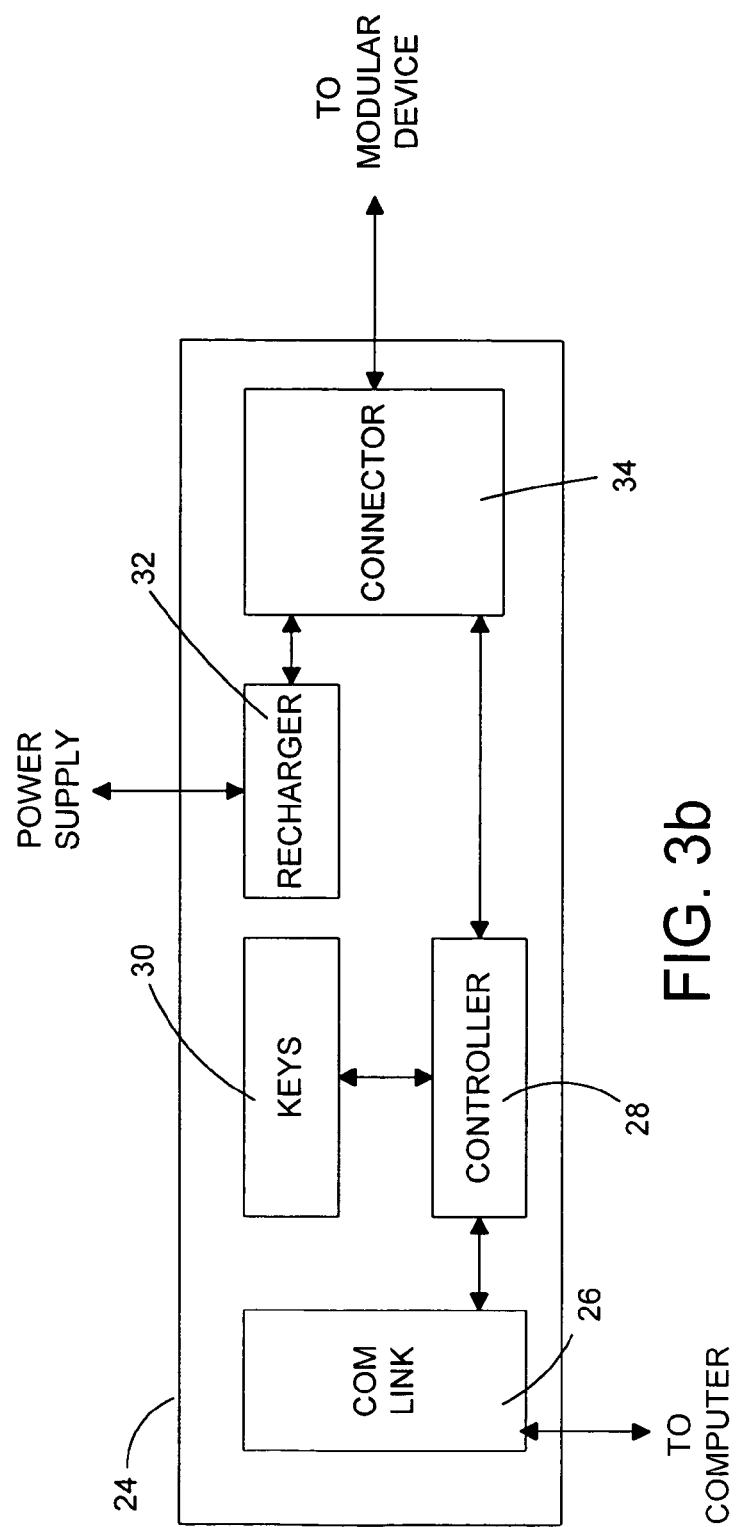
FIG. 3(b) is a block diagram of an inventive keyboard according to a specific embodiment of the invention.

The description of the inventive keyboard with cradle as provided in FIG. 2 describes to those of ordinary skill within the art the basic configuration and operation of an embodiment of the invention. The following description of FIG. 3(a) and FIG. 3(b) provides information to those of ordinary skill within the art as to the construction of the inventive keyboard according to different embodiments of the invention. However, the construction of stand-alone cradle devices in general is known within the art. For example, as previously described, U.S. Robotics includes a stand-alone cradle with its Pilot PDA device. Therefore, the enabling description of the invention provided here takes into account such knowledge by those of ordinary skill within the art.

Referring now to FIG. 3(a), a block diagram of an inventive keyboard according to one embodiment of the invention is shown. Keyboard 80 includes a hub controller 82, such as an Intel 8x930HX USB Hub Peripheral Controller keys 84, and connector 86. Hub controller 82 is ultimately coupled to the computer through the USB, as known within the art. Controller 82 manages the information flow from the keyboard, both from keys 84 and the modular device attached to connector 86, to the computer through USB.

The computer to which keyboard 24 is ultimately coupled through the USB includes a driver program to interpret information received from the keyboard over the USB. Development of keyboard drivers for operating systems such as versions of the Microsoft Windows operating system is known within the art. Furthermore, development of drivers for devices such as PDA devices like the U.S. Robotics Pilot device is also known within the art. A driver to accommodate the embodiment of the invention of FIG. 3(a) includes capability of both such drivers. That is, such a driver interprets information regarding the actuation and release of keys 84 of keyboard 80, as well as information sent to or received from the modular device connected to connector 86.

Keys 84 are the standard computer keys of keyboard 80 as has already been described. Such keys include alphanumeric keys, cursor keys, navigation keys, DOS keys, and function keys. In one embodiment of the invention, the numeric keypad keys are replaced by a cradle for a modular device. However, the invention is not so limited, and a keyboard having both numeric keypad keys and such a cradle is within the scope of the invention. Actuation or release of any of keys 84 is transmitted to the computer to which keyboard 80 is attached via the USB.

Finally, as has been described, connector 86 permits the connection of a modular device to keyboard 80. When a corresponding connector of the device is coupled to connector 80, the device is said to be operating in a docking mode, as opposed to a stand-alone mode, in which suitable devices are operable when not connected to keyboard 80. Connector 86 in one embodiment resides at the bottom of a cradle of a computer keyboard (e.g., cradle 20 of keyboard 16 of FIG. 2). A corresponding modular device in this embodiment has a corresponding connector on the bottom of the device, such that placement of the device into the cradle automatically couples the two connectors. Note that the USB supports hot-plug detection, as known within the art. The invention is not particularly limited to any given type of connector 86.

Figure 3C:
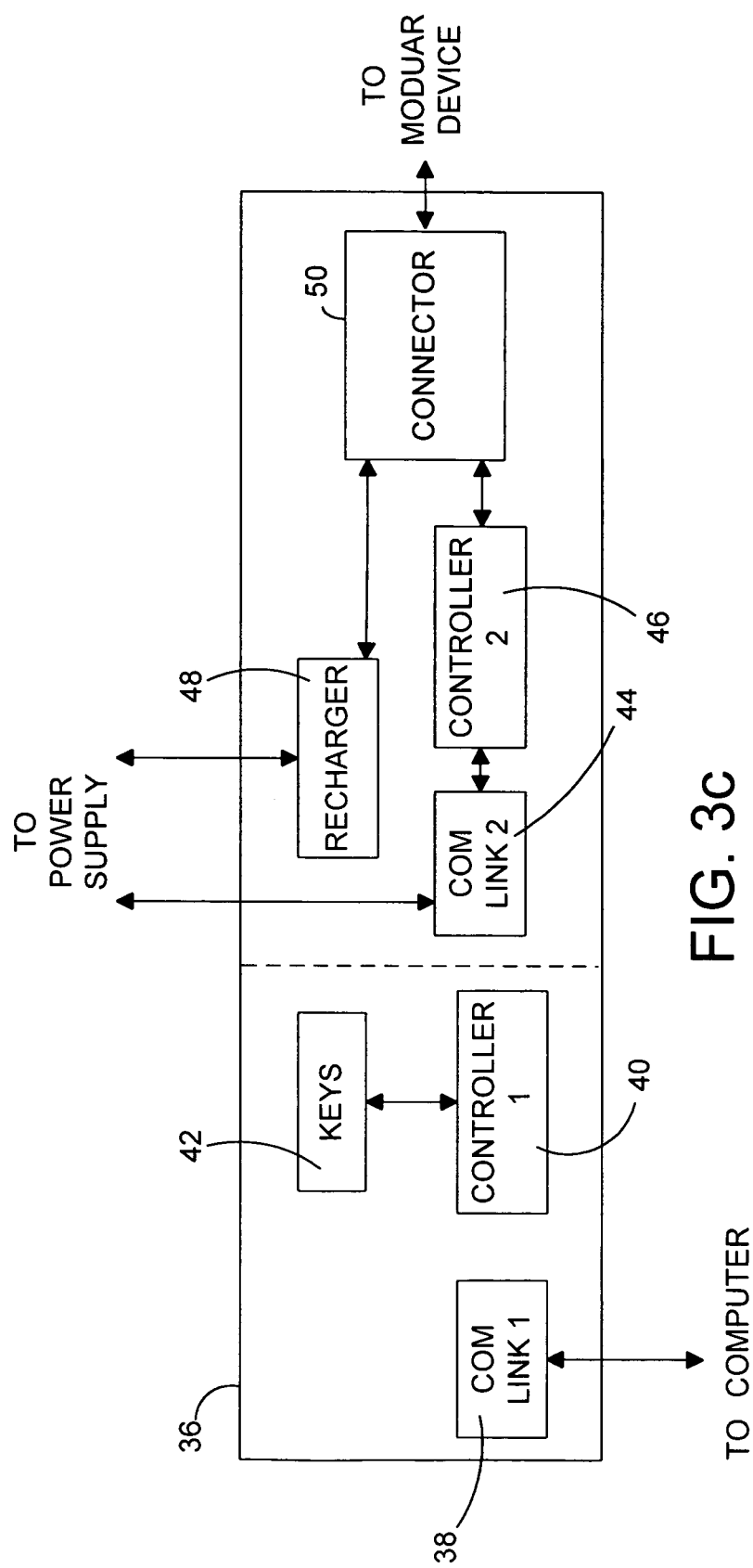
FIG. 3(c) is a block diagram of an inventive keyboard according to another specific embodiment of the invention.

Referring now to FIG. 3(*b*), a block diagram of an inventive keyboard according to a more specific embodiment of the invention is shown. Keyboard 24 includes communications link 26, controller 28, keys 30, recharger 32, and connector 34. As has been described, communications link 26 permits communication between keyboard 24 and the computer to which it is coupled. Link 26 in different embodiments is a serial cable for insertion into a corresponding serial port of the computer, a USB cable for insertion into a corresponding USB port of the computer, and a wireless transceiver for communication with a corresponding transceiver of the computer.

In the embodiment shown in FIG. 3(*b*), the communications link includes only a single cable or wireless transceiver for communication with the computer. That is, information regarding the depression of keys of the computer, as well as information from a modular device connected to the keyboard, are both sent over the single cable or with the single wireless transceiver. There is not an additional cable or transceiver for the modular device, for example.

Controller 28 manages the information flow from the keyboard, both from keys 30 and the modular device attached to connector 34, to the computer through communications link 26. Controller 28 is in one embodiment a specialized integrated circuit, such as an Intel 8x930HX USB Hub Peripheral Controller, built for this purpose. The construction of such controllers is known within the art.

The computer to which keyboard 24 is coupled includes a driver program to interpret information received from the keyboard over communications link 26. Development of keyboard drivers for operating systems such as versions of the Microsoft Windows operating system is known within the art. Furthermore, development of drivers for devices such as PDA devices like the U.S. Robotics Pilot device is also known within the art. A driver to accommodate the embodiment of the invention of FIG. 3(*b*) includes capability of both such drivers. That is, such a driver interprets information regarding the actuation and release of keys 30 of keyboard 24, as well as information sent to or received from the modular device connected to connector 34.

Keys 30 are the standard computer keys of keyboard 24 as has already been described. Such keys include alphanumeric keys, cursor keys, navigation keys, DOS keys, and function keys. In one embodiment of the invention, the numeric keypad keys are replaced by a cradle for a modular device. However, the invention is not so limited, and a keyboard having both numeric keypad keys and such a cradle is within the scope of the invention. Actuation or release of any of keys 30 is transmitted to the computer to which keyboard 24 is attached via controller 28.

Recharger 32 as shown in FIG. 3(*b*) is a preferred but not necessary feature of keyboard 24. Recharger 32 connects to an external power supply (for example, via an alternating current (AC) adapter), or may also receive power through the USB power line. Recharger 32 recharges the batteries of a modular device plugged into connector 34. In this way, the modular device can transfer information to the computer via keyboard 24 while it is docked into the keyboard, and at the same time have its batteries recharged. The construction of such rechargers is known within the art, and the invention is not particularly limited to any given recharger. Furthermore, the keyboard in an alternative embodiment includes the power source within its housing to facilitate cordless operation.

Finally, as has been described, connector 34 permits the connection of a modular device to keyboard 24. When a corresponding connector of the device is coupled to connector 34, the device is said to be operating in a docking mode, as opposed to a stand-alone mode, in which suitable devices are operable when not connected to keyboard 24. Connector 34 in one embodiment resides at the bottom of a cradle of a computer keyboard (e.g., cradle 20 of keyboard 16 of FIG. 2). A corresponding modular device in this embodiment has a corresponding connector on the bottom of the device, such that placement of the device into the cradle automatically couples the two connectors. Note that the USB supports hot-plug detection, as known within the art.

The invention is not limited to any particular type of connector 34. However, in one embodiment of the invention, in which the modular device connector to plug into is a U.S. Robotics Pilot device connector, the connector is as described in "The Undocumented Pilot Page," available at the Internet world-wide web site at the URL address http://www.bright.net/~mitch/pilot/hw07.html, which is hereby incorporated by reference.

Referring now to FIG. 3(*c*), a block diagram of an inventive keyboard according to another specific embodiment of the invention is shown. Keyboard 36 is similar to keyboard 24 of FIG. 3(*b*). Keyboard 36 includes first communications link 38, first controller 40, keys 42, second communications link 44, second controller 46, recharger 48, and connector 50. Note that reference to "the communications link of the keyboard" is inclusive of and refers to both communications links 38 and 44.

Communications link 38 permits communication between keys 42 of keyboard 36 and the computer to which the keyboard is coupled. Link 38 in different embodiments is a serial cable, a USB cable, and a wireless transceiver. First controller 40 manages the information from keys 42 through link 38 to the computer, and is in one embodiment a specialized integrated circuit. Finally, keys 42 are the standard computer keys as has already been described.

Communications link 38, controller 40, and keys 42 therefore are identical components to what is known within the art as a standard computer keyboard. While keyboard 36 also has the capability to receive the docking of a modular device, this functionality is separate from the core text input functionality of the keyboard effectuated via link 38, controller 40, and keys 42. Therefore, these components operate identically to their counterparts of prior art keyboards.

Second communications link 44 permits communication between a modular device docked with keyboard 36 and the computer to which the keyboard is coupled. Link 44 in different embodiments is also a serial cable, a USB cable, and a wireless transceiver. Second controller 46 is optional, depending on the modular device coupled to connector 50, but where present manages the information flow from the modular device to the computer through link 44. For example, in the embodiment in which connector 50 interfaces to a U.S. Robotics Pilot device, a direct passing through of connector 50 to communications link 44 is effectuated, such that controller 46 is not necessary.

Finally, recharger 48 and connector 50 correspond to their counterparts of FIG. 3(b), and reference should be made to the description thereto for further understanding. Recharger 48 is preferred but optional, and recharges the batteries of a device plugged into connector 50. Connector 50 permits the connection of a modular device for operation in a docking mode. The invention is not limited to any particular connector 50.

As has been described, keyboard 36 has two communications links. Put another way, the communications link of keyboard 36 includes a first cable, transceiver, etc. (communications link 38), and a second cable, transceiver, etc. (communications link 44). In the case where there are two cables, each cable plugs into a different port on the back of the computer to which the keyboard is coupled.

The advantage to this approach is that a customized driver within the computer is not required. That is, a keyboard driver compatible with a standard computer, as has already been described, is sufficient to control that part of keyboard 36 that plugs into the computer as does a standard keyboard, and a modular device driver compatible with a preexisting cradle for the device, as has also already been described, is sufficient to control the part of keyboard 36 that plugs into the computer as does the preexisting cradle. These two parts are integrated within keyboard 36, but operate essentially as separate devices. The disadvantage to this approach, however, is that unlike the embodiment of FIG. 3(b), there is not a single cable between the keyboard and the computer.

Figure 4A:
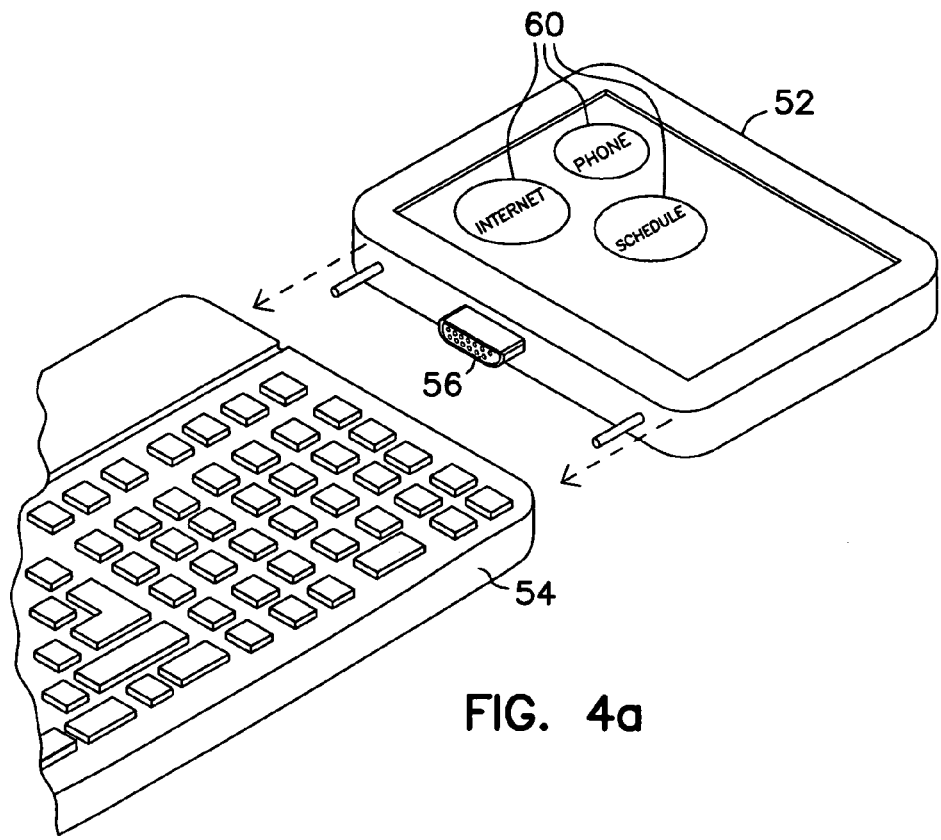
FIG. 4(a) and FIG. 4(b) are diagrams showing a touch screen modular device having virtual keys, according to one embodiment of the invention; and, FIG. 5 is a block diagram of a touch screen modular device having virtual keys, according to one embodiment of the invention.
Figure 4B:
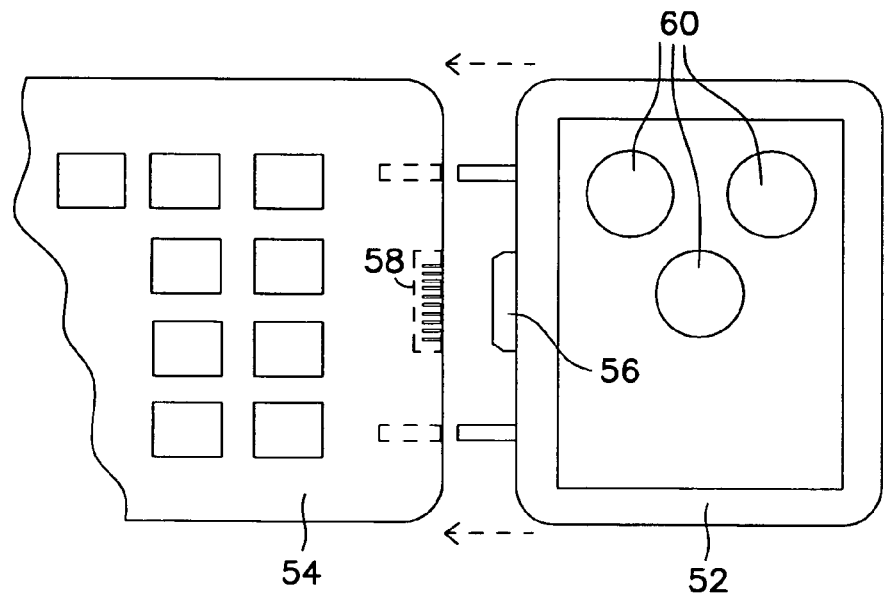

Referring now to FIG. 4(a) and FIG. 4(b), diagrams of a novel touch screen modular device having virtual keys for use with a keyboard as has already been described, according to one embodiment of the invention, are shown. Device 52 plugs into keyboard 54 via a connector 56 disposed within its housing and coupling a corresponding connector 58 of the keyboard. As shown in FIG. 4(a) and FIG. 4(b), the top and bottom surfaces of the housing of device 52 are preferably flush with corresponding top and bottom surfaces of keyboard 54 when in the docking mode. The invention is not particularly limited to any given connector 56 or 58. Device 52 includes touch screen 59, upon which a plurality of changeable virtual keys 60 are displayed.

Device 52 extends the capability of keyboard 54. When plugged into keyboard 54 (or any other suitable computer peripheral), device 52 communicates in one embodiment with a computer coupled to keyboard 54 through the keyboard in a docking mode. The invention is not limited to any particular purpose for any of changeable virtual keys 60. However, it is contemplated that such keys are programmed in accordance with computer software applications running on the computer, and change in accordance with the active application on the computer.

For example, a word processing program may define the keys so that they correspond to common word processing function, such as save, print, cut, paste, etc. The virtual keys are displayed on touch screen 59, accordingly labeled. A user wishing to "actuate" a key presses against the section of the touch screen on which the desired virtual key is displayed. Such virtual keys are advantageous to typical function keys found on computer keyboards inter alia because they are automatically relabeled in accordance with the currently active application. The user, for example, does not have to remember what "F1" stands for in a particular application as is the case with standard function keys.

In one embodiment, device 52 is also operable in a stand-alone mode. In this embodiment, device 52 includes a wireless transceiver corresponding to a wireless transceiver of the computer with which it desirably communicates. Device 52 also includes in this embodiment an integrated power source (e.g., rechargeable batteries). In the stand-alone mode, device 52 acts as a truncated wireless computer keyboard, or a dynamic computer remote control. Unlike wireless computer keyboards, or computer remote controls, however, device 52 also has the capability to operate in a docking mode, and has the capability to have changeable virtual keys.

The use of device 52 in a stand-alone mode is exemplified in conjunction with the running of a Internet world-wide-web browsing application on the computer. Such an application (e.g., Netscape Navigator, television remote control application, digital video disc (DVD) and/or compact disc (CD) control applications, etc.) may have commands such as previous page, next page, enter, etc., for which function keys are defined, or on-screen buttons are displayed. Having virtual keys for these commands on the touch screen of device 52 is useful particularly in the stand-alone mode. In such case, the device 52 acts essentially as a dynamic remote control device for viewing Internet web pages on the computer. The computer user is not tied to a viewing position close by the keyboard to provide input to the computer.

In an alternative embodiment to that shown in FIG. 4(a) and FIG. 4(b), device 52 communicates with the computer via a wireless transceiver regardless of whether it is in a docking mode or a stand-alone mode. In this embodiment, there is no connector of device 52 (such as connector 56) that plugs into a corresponding connector of keyboard 54 (such as connector 58). Rather, the keyboard only provides a suitable physical docking space, such as a cradle, for the device (e.g., cradle 20 as shown in FIG. 2), and does not facilitate communication between the computer and the device 52.

Figure 5:
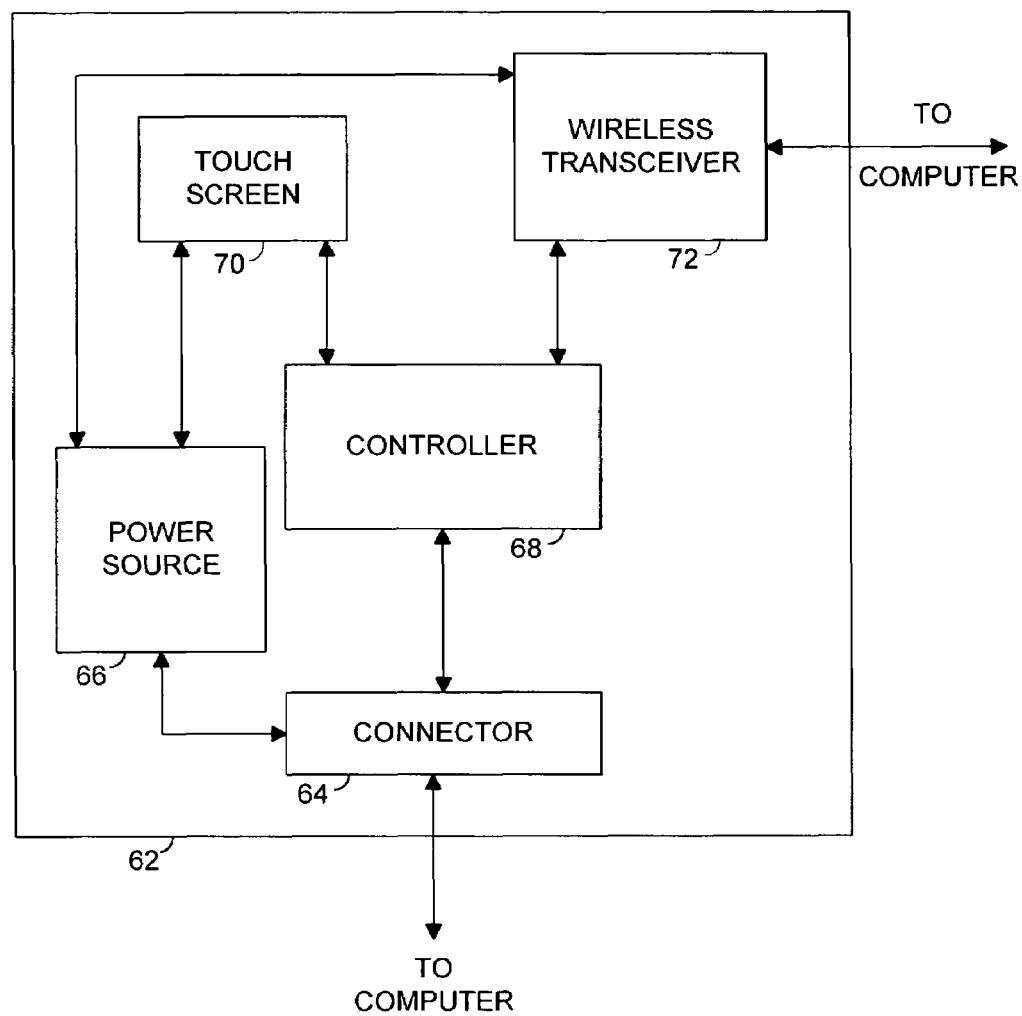

The description of the inventive device shown in FIG. 4(a) and FIG. 4(b) describes to those of ordinary skill within the art the basic configuration and operation of an embodiment of the invention. The following description of FIG. 5 provides information to those of ordinary skill within the art as to the construction of the inventive device according to one embodiment of the invention. The enabling description of the invention provided here takes into account knowledge of those of ordinary skill within the art.

Referring to FIG. 5, a block diagram of a touch screen device having virtual keys, according to one embodiment of the invention, is shown. Device 62 includes connector 64, power source 66, controller 68, touch screen 70, and wireless transceiver 72. Connector 64 permits the connection of device 62 to a corresponding connector of a computer peripheral, such as a computer keyboard, in a docking mode, for communication with the computer to which the peripheral is attached. The invention is not limited to any particular type of connector 64. Such connectors include a ten-pin card edge connector, as found on the U.S. Robotics Pilot device. As already described, in an alternative embodiment of the invention, connector 64 is not present, in which case it does not communicate with the computer via the peripheral.

Power source 66 provides power to device 62 in a stand-alone mode. Preferably, power source 66 includes rechargeable batteries, which are recharged in the docking mode via a corresponding recharger of the computer peripheral coupled through connector 64. Rechargeable batteries amenable to the invention include Lithium Ion, Nickel Metal Hydride, and Nickel Cadmium batteries, as known within the art.

Controller 68 controls the operation of device 62. That is, it communicates with the computer via connector 64 and a computer peripheral in the docking mode, and via wireless transceiver 72 and a wireless transceiver of the computer in the stand-alone mode. Controller 68 communicates the pressing of a virtual key on touch screen 70 by a user of the device, and also receives information from the computer as to the definition of such virtual keys (i.e., the number of virtual keys, how the virtual keys should be labeled, etc.). Controller 68 is preferably a specialized integrated circuit having this functionality, construction of which is known within the art. Such integrated circuits include the Intel Hub Controller previously described.

Touch screen 70 is a pressure-sensitive display device, such as a resistive pressure-sensitive liquid crystal display. It provides for both output and input with a user of the device. For example, it displays the one or more virtual keys as controlled by controller 68, and is responsive to a user pressing against the touch screen on a virtual key (or any other section of the screen) as well. Touch screens are known within the art. Such devices with touch screens include the U.S. Robotics Pilot, the Apple Newton, the Kenwood KC-21, and the Cannon NP6050 copier.

Finally, wireless transceiver 72 preferably communicates with a corresponding wireless transceiver of the computer in a wireless mode. Such transceivers include radio frequency (RF) and infrared transceivers, and are known within the art. For example, an RF transceiver may communicate over 900 MHZ, as is known within the art. Wireless transceiver 72 permits controller 68 to send and receive information from the computer.

In an alternative embodiment, transceiver 72 is used to communicate with the computer even when device 62 is in the docking mode, in the case where device 62 does not have a connector 64 and/or the peripheral to which the device is docked does not have a corresponding connector. In another alternative embodiment, transceiver 72 is used to communicate with a corresponding transceiver of a computer peripheral, such as a keyboard, through which communication with the computer is achieved, and not directly with a transceiver of the computer.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A keyboard comprising:
    a housing defining a non-integral personal computer keyboard;
    a plurality of keys disposed within the housing;
    a communications link disposed within the housing, wherein the communications link is capable of communicating with a remote computer; and,
    a connector operatively coupled to the communications link, said connector being disposed within the housing and being receptive to a corresponding connector of a device such that the device communicates with the computer over the communications link when the connectors are coupled, the housing having a cavity in an upper surface thereof and said connector being disposed proximate to said cavity so that the device is positioned in the cavity wherein the connectors are coupled.

2. The keyboard of claim 1, wherein the housing has a plurality of surfaces defining cavity proximate to which the connector is disposed, the cradle cavity being shaped so that the device fits into the cavity such that at least one surface of the device is exposed.

3. The keyboard of claim 2, wherein the cavity is shaped so that the device fits into the cavity such that at least a front surface of the device is exposed.

4. The keyboard of claim 2, wherein the cavity is shaped so that the device fits into the cavity such that at least a top surface of the device is exposed.

5. The keyboard of claim 1, wherein the communications link comprises at least a cable for connecting the keyboard to the remote computer.

6. The keyboard of claim 5, wherein the cable is a Universal Serial Bus (USB) compatible cable.

7. The keyboard of claim 5, wherein the communications link also comprises at least a radio frequency (RF) transceiver.

8. The keyboard of claim 1, further comprising a recharger operatively coupled to the connector of the keyboard to recharge a battery of the device when the connectors are coupled.

9. The keyboard of claim 1, further comprising a power source disposed within the housing.

10. The keyboard of claim 1, wherein the device is a personal digital assistant (PDA) device operable in a docking mode when the connectors are coupled and operable in a standalone mode when the connectors are uncoupled.

11. The keyboard of claim 1, wherein the device communicates with the computer in a docking mode when the connectors are coupled and in a stand-alone mode via a wireless transceiver of the device communicating with a corresponding wireless transceiver of the computer.

12. The keyboard of claim 1, wherein the device is a touch screen device having at least one changeable virtual key that interacts with the computer.

13. The keyboard of claim 1, wherein the device includes a power source.

14. The keyboard of claim 1, wherein the device is selected from the group of devices comprising a remote control for a television, a digital video disc (DVD) player, a compact disc (CD) player, and a telephone handset.

15. A keyboard comprising:
    a housing defining a non-integral personal computer keyboard;
    a plurality of keys disposed within the housing;
    a communications link disposed within the housing, wherein the communications link is capable of communicating with a computer; and,
    a connector disposed within the housing and receptive to a corresponding connector of a personal digital assistant (PDA) device such that the PDA device communicates with the computer over the communications link when the connectors are coupled, said connector disposed within the housing being positioned on the housing such that a PDA that communicates with the computer when the connectors are coupled rests on an upper surface of the housing.

16. A keyboard comprising:
    a housing defining a non-integral personal computer keyboard;
    a plurality of keys disposed within the housing;

a communications link disposed within the housing, wherein the communications link is capable of communicating with a computer; and, a connector disposed within the housing and receptive to a corresponding connector of a personal digital assistant (PDA) device such that the PDA device communicates with the computer over the communications link when the connectors are coupled, said housing having a plurality of surfaces defining a cradle cavity into which the connector is disposed, and the cradle cavity being shaped so that the PDA device fits into the cavity such that at least one surface of the device is exposed.

17. A keyboard comprising:

a housing defining a non-integral personal computer keyboard;

a plurality of keys disposed within the housing;

a communications link disposed within the housing, wherein the communications link is capable of communicating with a computer; and, a connector disposed within the housing and receptive to a corresponding connector of a device having a touch screen such that the device communicates with the computer over the communications link when the connectors are coupled, the housing having an end surface in which the connector is disposed and against which the device abuts when said connectors are coupled, the connector of the device being coupled, in use, to the connector of the housing such that at least one of a top surface and a bottom surface of the device is flush with, so as to be disposed in a common plane with a corresponding surface of the housing.

18. The keyboard of claim 17 wherein said housing includes a cradle cavity in which the device nests and which includes a support surface on which a major surface of the device rests.

19. The keyboard of claim 17 wherein said keyboard and the device are coupled together by a coupling means including at least one projecting elements provided on one of the housing and the device and a receives for receiving said at least one projecting element provided in the other of and houses and the device.

20. A keyboard comprising:

a housing defining a non-integral personal computer keyboard;

a plurality of keys disposed within the housing;

a communications link disposed within the housing, wherein the communications link is capable of communicating with a remote computer; and, a connector operatively coupled to the communications link, said connector being disposed within the housing and being receptive to a corresponding connector of a device such that the device communicates with the computer over the communications link when the connectors are coupled, said housing including a cradle cavity in which the device nests and which includes a support surface on which a major areal surface of the device rests.

* * * * *